(12) United States Patent
Tulugu et al.

(10) Patent No.: US 12,478,936 B2
(45) Date of Patent: Nov. 25, 2025

(54) MIXER TANK COVER ASSEMBLY

(71) Applicant: Coperion Food Equipment LLC, Sidney, OH (US)

(72) Inventors: Venugopala R. Tulugu, Centerville, OH (US); Zachary D. Fogt, Springfield, OH (US)

(73) Assignee: COPERION FOOD EQUIPMENT LLC, Sidney, OH (US)

( * ) Notice: Subject to any disclaimer, the term of this patent is extended or adjusted under 35 U.S.C. 154(b) by 797 days.

(21) Appl. No.: 17/671,129

(22) Filed: Feb. 14, 2022

(65) Prior Publication Data

US 2022/0258115 A1    Aug. 18, 2022

Related U.S. Application Data

(60) Provisional application No. 63/149,467, filed on Feb. 15, 2021.

(51) Int. Cl.
*B01F 35/00* (2022.01)
*B01F 27/90* (2022.01)
*B01F 35/221* (2022.01)
*B01F 35/45* (2022.01)
*B01F 101/06* (2022.01)

(52) U.S. Cl.
CPC ............ *B01F 35/453* (2022.01); *B01F 27/90* (2022.01); *B01F 35/221422* (2022.01); *B01F 2101/06* (2022.01)

(58) Field of Classification Search
CPC .......... B01F 2101/06; B01F 35/221422; A47J 43/0761
See application file for complete search history.

(56) References Cited

U.S. PATENT DOCUMENTS

2018/0255975 A1* 9/2018 Kolar ........................ H04B 5/77
2021/0220785 A1* 7/2021 Ambrose ................ B08B 9/087

* cited by examiner

*Primary Examiner* — Anshu Bhatia
(74) *Attorney, Agent, or Firm* — DINSMORE & SHOHL LLP

(57) ABSTRACT

A food ingredient mixer includes a tank defining an internal mixing volume, the tank including an upper opening, and an agitator disposed in the internal mixing volume and movable for mixing ingredients and a cover assembly associated with the upper opening, the cover assembly including a first part through which ingredients may be added to the internal mixing volume and a second part movable between a first position that overlies the first part and a second part that exposes the first part.

16 Claims, 6 Drawing Sheets

MIXER TANK COVER ASSEMBLY

TECHNICAL FIELD

This application relates generally to bulk food product mixers and, more specifically, to mixer tank cover assembly for bulk food product mixers, such as slurry mixers used for mixing cake, other batters or some other unaerated premix of ingredients.

BACKGROUND

Slurry mixers are commonly used in food production for mixing cake or other batters or to prepare a uniform, unaerated premix of ingredients, typically for use with continuous mixing systems. Referring to FIGS. 1A-1C, such mixers typically include a tank 1 with internal mixing volume, and an agitator 2, which may be formed by a centrally disposed vertical mixing shaft with one or more sets a mixing blades extending from the shaft and distributed throughout a height of the internal mixing volume. The tank includes an outlet 3 from which mixed materials can be pumped to another processing station. The tank includes an upper opening 4 through which ingredients can be added, and a lid 5 that is movable between open (FIG. 1C) and closed (FIG. 1B) positions. The mixers also include a controller for mix operations. When the lid 5 is closed, an interlock switch engages to allow the mixer agitator to run mixer at a desired or set speed. When the lid 5 is open, such as through a pneumatically connected air cylinder 6, the interlock switch is disengaged, sending a signal to the controller to stop the agitator. Thus, when the lid is open to add mix ingredients, the agitator is not moving. One problem with this system is that initiating movement of the agitator after bulk ingredients have been added can be difficult. In addition, the overall mixing time required is increased as a result of such agitator stops.

It would be desirable to provide an improved slurry mixer adapted for ingredient addition.

SUMMARY

In one aspect, a food ingredient mixer includes a tank defining an internal mixing volume, the tank including an upper opening, and an agitator disposed in the internal mixing volume and movable for mixing ingredients. A cover assembly is associated with the upper opening. The cover assembly includes a screen member and a lid member. The screen member is movable between a closed position covering the upper opening and an open position uncovering the upper opening, the screen member including a plurality of openings through which ingredients can be added to the tank when the screen member is in the closed position. The lid member movable between a closed position covering the upper opening and an open position uncovering the upper opening, wherein the lid member overlies the screen member when the lid member is in the closed position.

In another aspect, a food ingredient mixer includes a tank defining an internal mixing volume, the tank including an upper opening, an agitator disposed in the internal mixing volume and movable for mixing ingredients and a cover assembly associated with the upper opening. The cover assembly includes a first part through which ingredients may be added to the internal mixing volume and a second part movable between a first position that overlies the first part and a second part that exposes the first part.

In a further aspect, a method of operating a food ingredient mixer that includes a tank defining an internal mixing volume, the tank including an upper opening, an agitator disposed in the internal mixing volume and movable for mixing ingredients, and a cover assembly associated with the upper opening. The method involves: closing both a screen member of the cover assembly and a lid member of the cover assembly during a mixing operation, wherein the lid member overlies the screen member; and opening the lid member of the cover assembly, while the screen member remains, closed, and adding ingredients to the internal mixing volume through the screen member.

The details of one or more embodiments are set forth in the accompanying drawings and the description below. Other features, objects, and advantages will be apparent from the description and drawings, and from the claims.

DETAILED DESCRIPTION

Figure 1A:
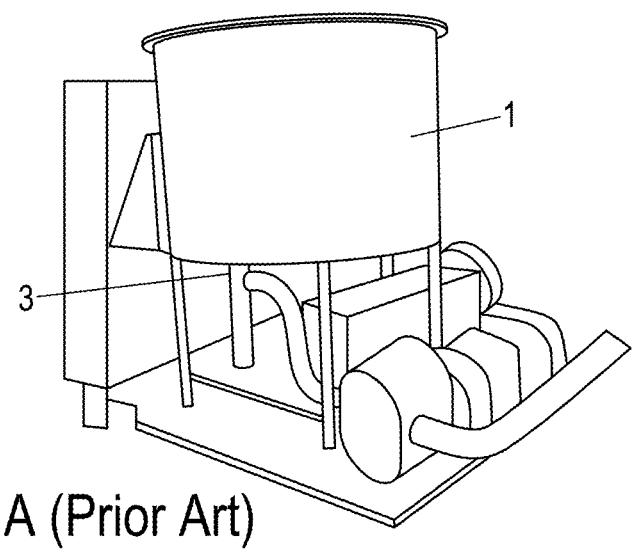
FIGS. 1A-1C show views of a prior art slurry mixer.
Figure 1B:
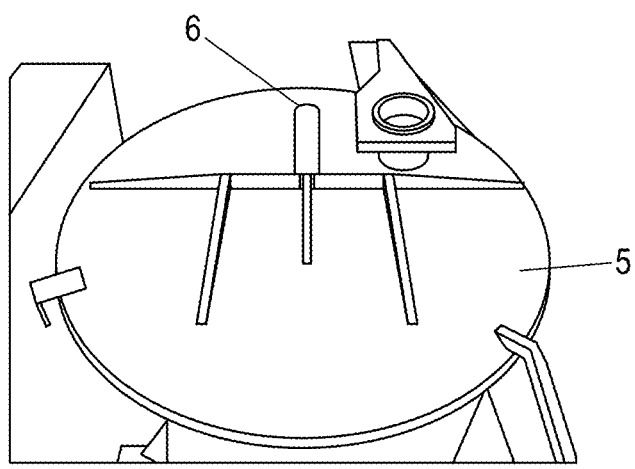
Figure 1C:
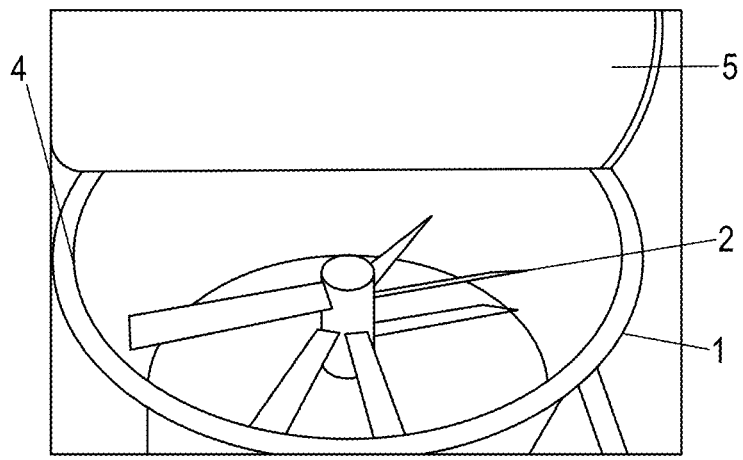
Figure 2:
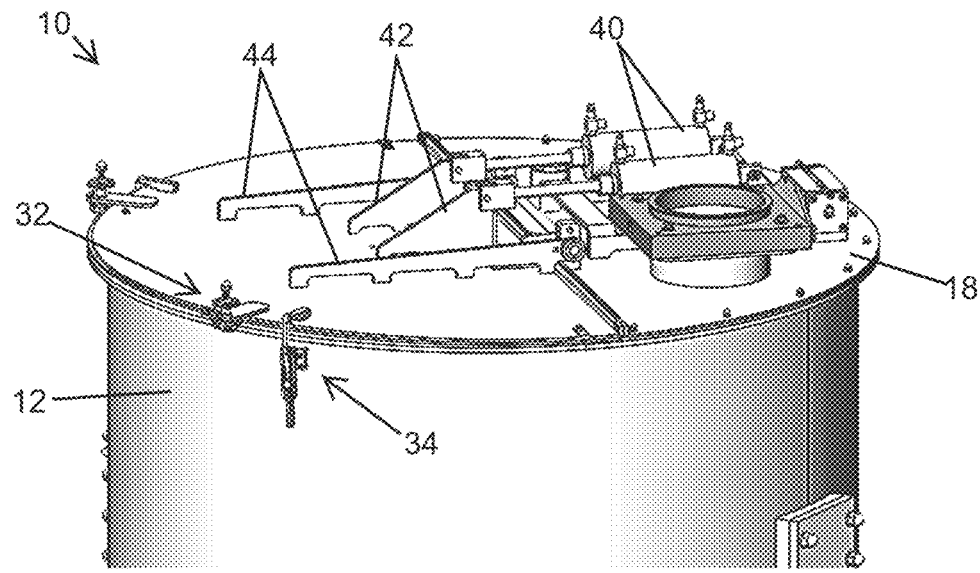
FIG. 2 shows a partial perspective view of a food ingredient mixer, such as a slurry mixer, according to the present application.
Figure 3:
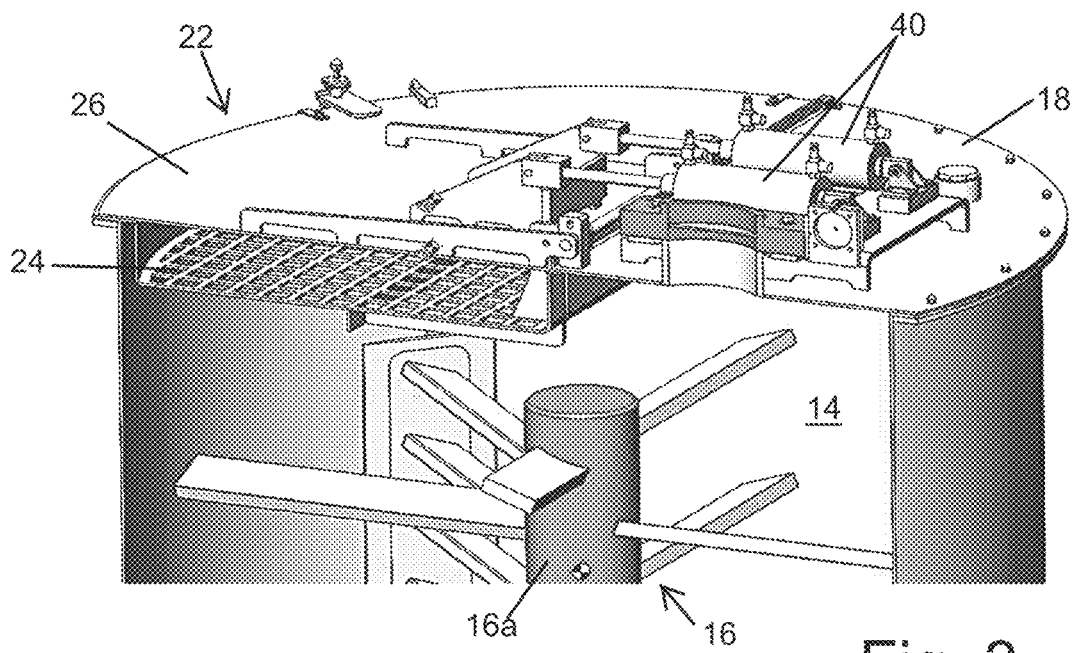
FIG. 3 shows the mixer in cut away.

Referring to FIGS. 2-11, a food ingredient mixer 10, such as a slurry mixer, includes a tank 12 defining an internal mixing volume 14 in which a rotatable agitator 16 with vertical shaft 16a and blades 16b is located. The tank includes a fixed top plate 18 and an upper opening 20 with a movable cover assembly 22. Here, the opening 20 is approximately half the cylindrical size of the tank, though other variations are possible.

The cover assembly 22 is associated with the upper opening and includes both a screen member 24 and a lid member 26. The screen member 24 is movable between a closed position covering the upper opening (e.g., per FIGS. 2-4, 6-7 and 9-10) and an open position uncovering the upper opening (e.g., per FIG. 8). The lid member 26 is also movable between a closed position covering the upper opening (per FIGS. 2, 3, 6 and 9) and an open position uncovering the upper opening (per FIGS. 4, 7 and 8). The lid member 26 overlies the screen member 24 when the lid member 26 is in the closed position (e.g., per FIG. 3).

Figure 4:
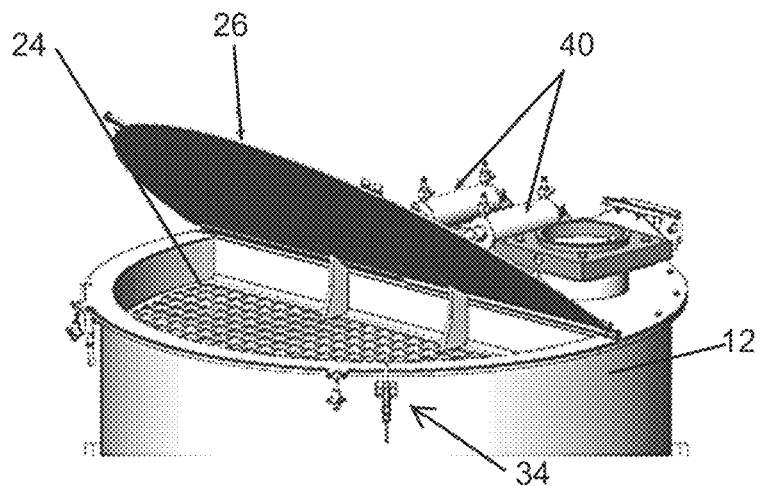
FIG. 4 shows a partial perspective with the lid member raised.
Figure 5:
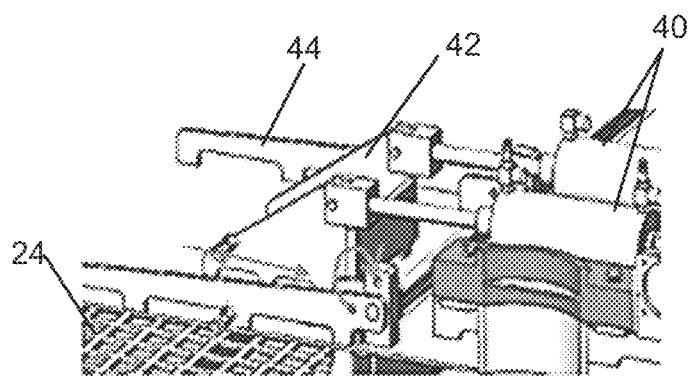
FIG. 5 shows a partial perspective of cylinders and brackets for raising and lowering the cover assembly.
Figure 6:
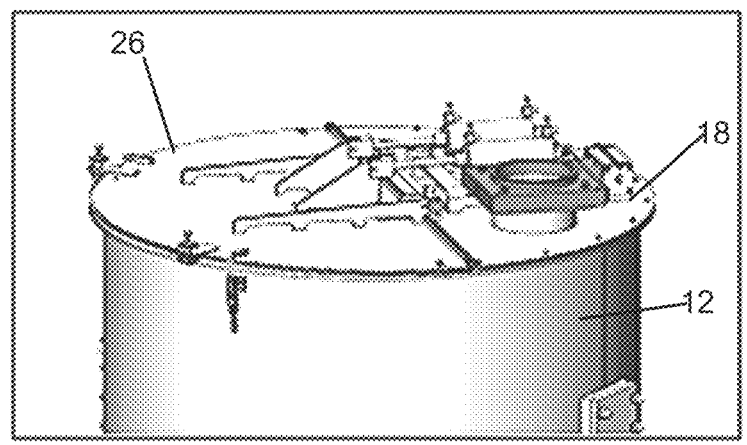
FIG. 6 shows a partial perspective with the cover assembly closed.
Figure 7:
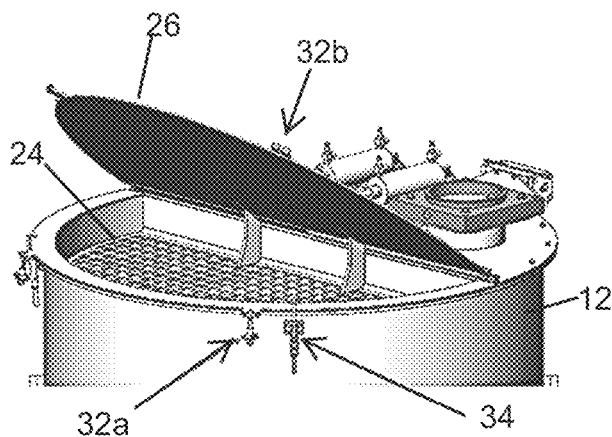
FIG. 7 shows a partial perspective with the lid member open and the screen member closed.

As shown, in a first configuration of the cover assembly, the lid member is movable from its closed position to its open position while the screen member remains in its closed position (per FIGS. 4 and 7). In a second configuration of the cover assembly, the lid member 26 and the screen member 24 are movable together between their respective closed positions and open positions (per FIG. 8).

The screen member 24 includes a plurality of openings 30 through which ingredients can be added to the tank when the screen member is in the closed position and the lid member is in its open position. As used herein, the term screen member is intended to encompass any structure with a plurality of openings that are large enough to allow food ingredients such as flour and water to be added to the internal mixing volume, but where the openings are small enough to prevent an adult operator from placing a hand into the internal mixing volume. For example, screen member may have openings 30 formed by a grate configuration as shown, or may be formed as a plate that has been perforated (openings circular or of any other shape).

One or more releasable latch members 32 are provided between the screen member 24 and the lid member 26 for selectively placing the cover assembly in the first configuration or the second configuration. Here, two latch members 32 are provided. Each latch member 32 is made up of a threaded hand knob 32a connected to the screen member 24 and a bracket 32b, with a slot, connected to the lid member 26. The shaft of the threaded knob is pivotable into the bracket slot and can be tightened to hold the screen member 24 and the lid member 26 together for movement together (the second configuration of the cover assembly). Likewise, upon loosening, the shaft of the threaded knob is pivotable out of the bracket slot and hangs downward so that the screen member 24 and the lid member are not connected for movement with each other (the first configuration of the cover assembly). Of course, other latch configurations could be used.

Figure 8:
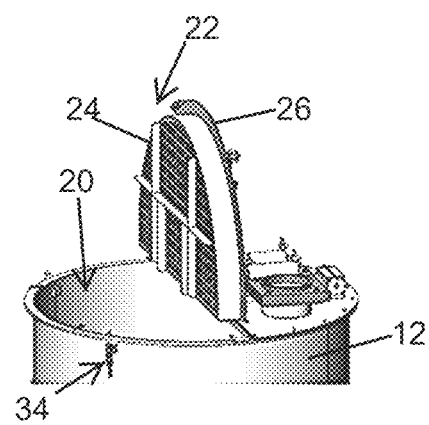
FIG. 8 shows a partial perspective with both the lid member and the screen member open.
Figure 9:
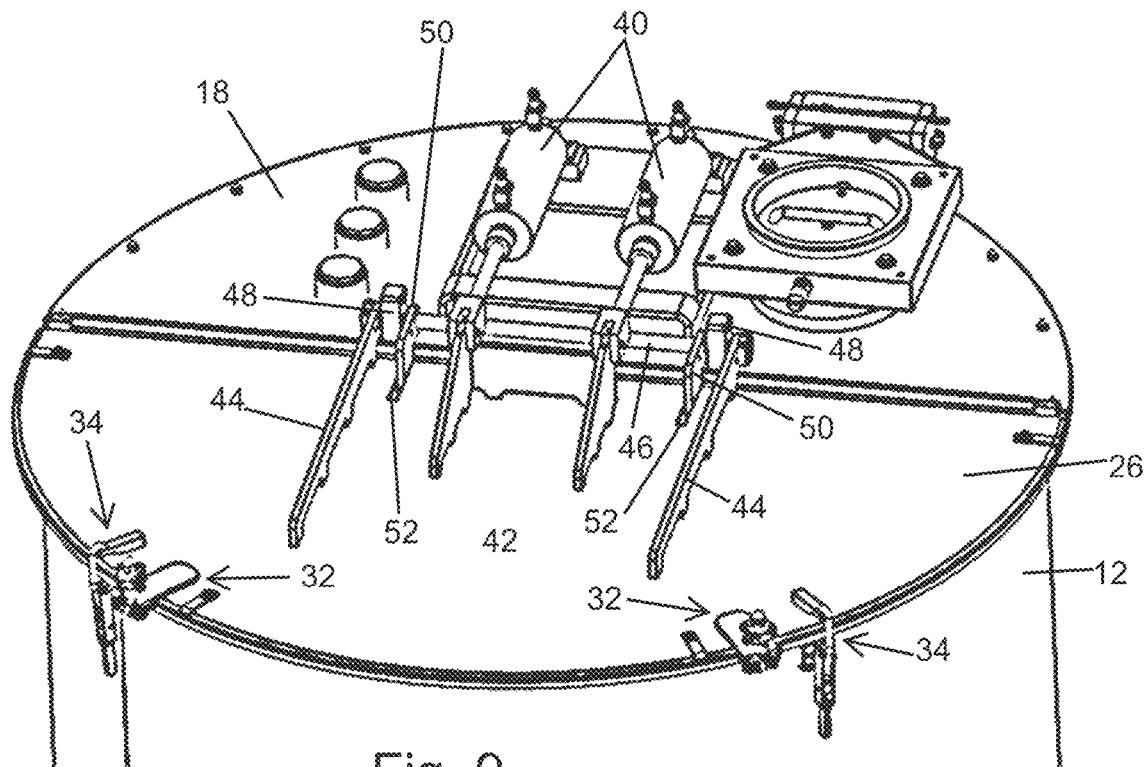
FIG. 9 shows another partial perspective of the top of the mixer.
Figure 10:
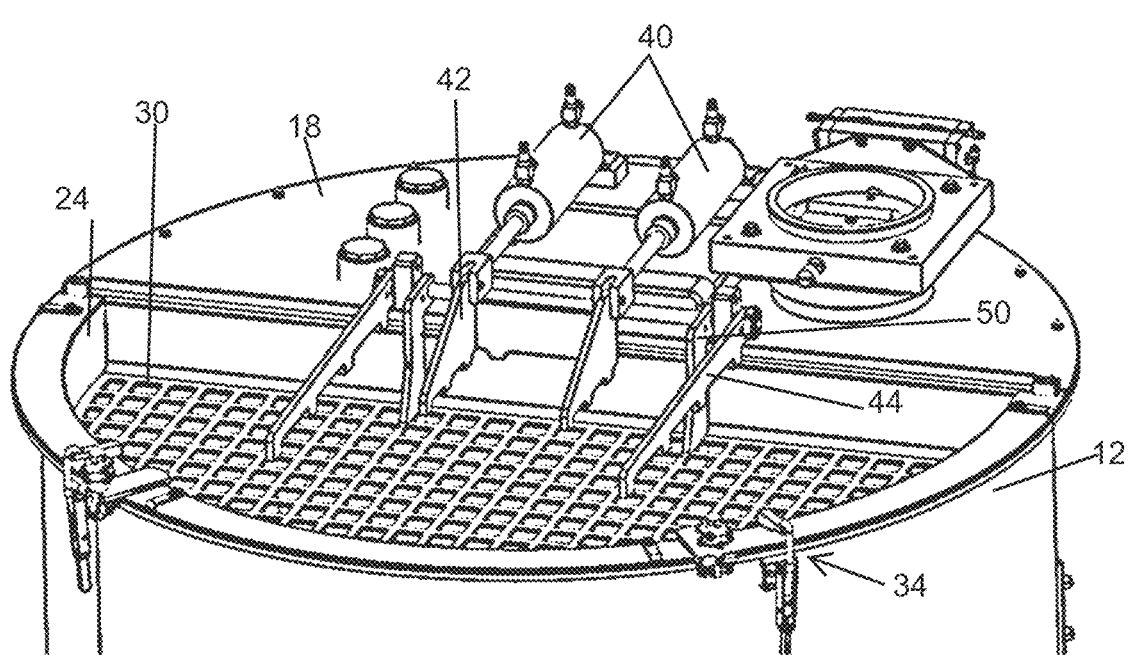
FIG. 10 shows a partial perspective of the top of the mixer with the lid member not shown.
Figure 11:
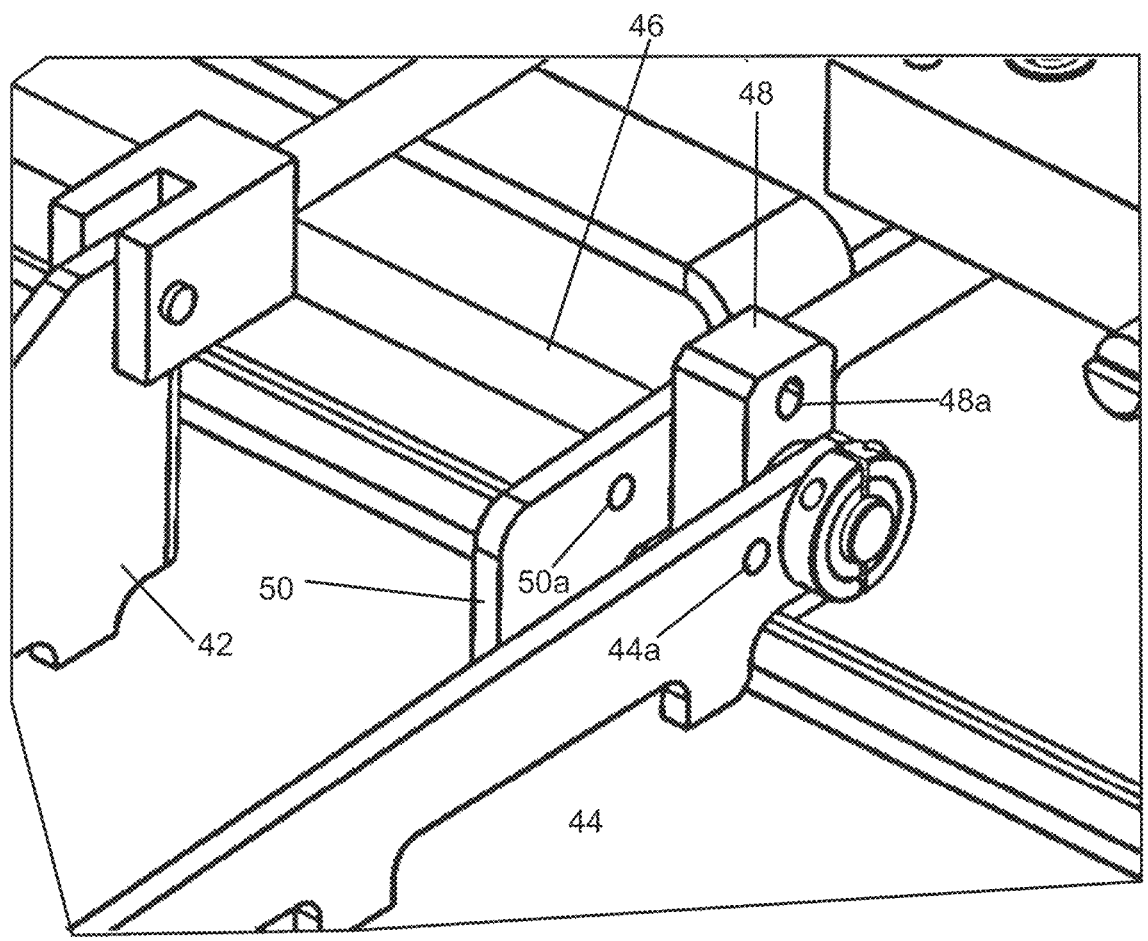
FIG. 11 shows a partial perspective a portion of the top of the mixer.
Figure 12:
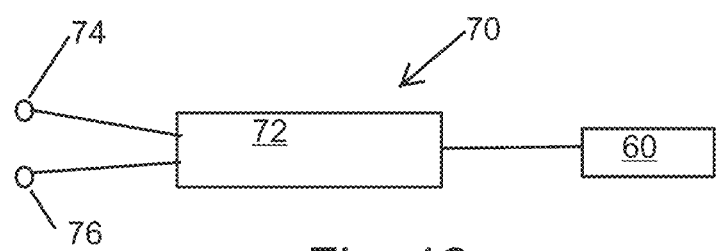
FIG. 12 shows an exemplary control system schematic.

One or more releasable latch members 34 are also provided between the tank 12 and the cover assembly, with the latch members configured to selectively (i) hold both the lid member 26 and screen member 24 closed during mixing (per FIG. 9), (ii) hold the screen member 24 closed while the lid member is opened (per FIG. 4) or (iii) allow both the screen member 24 and the lid member 26 to be opened per FIG. 8). The latch members 34 may, for example, be pivoting rod members mounted on the tank, with the rod members pivotable upward such that an end portion of the rod (e.g., leg of an L-shaped rod) extends over the top edge of the lid member (if both the lid member and the screen member are closed) or over the top edge of the screen member (if the lid member is open and the screen member is closed).

In terms of movement of the lid member 26 and screen member 24, here, two pneumatic cylinders 40 are mounted to the top plate 18 and include movable ends that connect pivotably to brackets 42 atop the lid member 26. The lid member also includes brackets 44 that pivotably connect to the ends of a pivot rod 46 that runs between mounts 48 on the top plate 18. When the pneumatic cylinders 40 retract, and the screen member 24 is not connected to move with the lid member 26, only the lid member 26 is pivoted upward about the pivot rod 46 (per the transition between FIGS. 6 and 7).

The screen member 24 includes brackets 50 that also pivotably connect to the pivot rod 46. The brackets 50 extend upward through slots 52 in the lid member 26, which allows the lid member 26 to move without moving the screen member 24. However, when the screen member 24 is coupled for movement with the lid member 26, the retraction of the pneumatic cylinders 40 causes both the lid member 26 and the screen member 24 to pivot upward about the pivot rod 46 (per the transition between FIGS. 6 and 8).

Notably, the brackets 44 and 50 each include respective openings 44a and 50a that are alignable with openings 48a in the mounts 48 to provide latching of the lid member 26 and screen member 24 in the fully open position of FIG. 8. In this regard, the latching could be achieved by insertion of a manual through-pin (not shown), Alternatively, spring-loaded pins loaded at both sides of the mount opening 48a could also be used for the latching. This latching arrangement facilitates maintaining the lid member 26 and screen member 24 open during cleaning of the internal mixing volume of the tank.

The mixer system also includes an agitator drive 60 (shown schematically) for controlling movement of the agitator, and a control system 70 configured for controlling the agitator drive 60 based at least in part upon the position of at least one of the lid member or the screen member. The control system 70 may be made up of a controller 72 and one or more sensors 74, 76. For example, sensor 74 may detect movement of the screen member 24 out of its closed position, and sensor 76 may detect movement of the lid member out of its closed position. Such detection many be direct (i.e., the sensors positioned to detect the screen member or lid member) or indirect (i.e., the sensors positioned to detect some other component, such as the brackets that move with the two members, or the position of the pneumatic cylinders). The sensors 74, 76 may be mechanical, optical, magnetic or other.

In either case, in embodiments, the control system 70 is configured to detect movement of the screen member 24 out of its closed position and, in such case, to prevent operation of the agitator drive 60, thus acting as a drive interlock that is dependent upon the screen member 24 being closed for agitator operation. In embodiments, the control system 70 is also configured to detect movement of the lid member 26 out of its closed position, while the screen member 24 remains in its closed position, and, in such case to reduce a speed of the agitator drive from a set operating speed (e.g., settable between 30 and 100 RPM) to an ingredient add speed (e.g., settable between 5 and 20 RPM). The use of the lower speed during ingredient add reduces the chance that the agitator will cause ingredient plumes that move upward back through the screen member 24. In embodiments, the control system is also configured to increase the speed of the at drive 60 from the ingredient add speed to the set operating speed based at least in part upon detection of the lid member 26 being moved back to its closed position. In one implementation, the control system is configured such that a predefined time condition must also be met before the control system increases the speed of the agitator drive from the ingredient add speed to the set operating speed. For example, the controller 72 includes a timer that is triggered when the lid member 26 opens and that must time out before the speed is increased back to the operating speed.

It is to be clearly understood that the above description is intended by way of illustration and example only, is not intended to be taken by way of limitation, and that other changes and modifications are possible.

What is claimed is:

1. A food ingredient mixer, comprising:
  a tank defining an internal mixing volume, the tank including an upper opening;
  an agitator disposed in the internal mixing volume and movable for mixing ingredients;
  a cover assembly associated with the upper opening, the cover assembly including:
    a screen member movable between a closed position covering the upper opening and an open position uncovering the upper opening, the screen member including a plurality of openings through which ingredients can be added to the tank when the screen member is in the closed position; and a lid member movable between a closed position covering the upper opening and an open position uncovering the upper opening, wherein the lid member overlies the screen member when the lid member is in the closed position, wherein, in a first configuration of the cover assembly, the lid member is movable from its closed position to its open position while the screen member remains in its closed position, wherein, in a second configuration of the cover assembly, the lid member and the screen member are movable together between their respective closed positions and open positions; and at least one releasable latch member between the screen member and the lid member for selectively placing the cover assembly in the first configuration or the second configuration.

2. The mixer of claim 1, further comprising at least one latch system for holding the lid member and the screen member in respective fully open positions during cleaning of the internal mixing volume.

3. The mixer of claim 1, further comprising:
an agitator drive for controlling movement of the agitator; and
a control system configured for controlling the agitator drive based at least in part upon the position of at least one of the lid member or the screen member.

4. The mixer of claim 3, wherein the control system is configured to detect movement of the screen member out of its closed position and, in such case, to prevent operation of the agitator drive.

5. The mixer of claim 4, wherein the control system is configured to detect movement of the lid member out of its closed position, while the screen member remains in its closed position, and, in such case to reduce a speed of the agitator drive from a set operating speed to an ingredient add speed.

6. The mixer of claim 5, wherein the control system is configured to increase the speed of the agitator drive from the ingredient add speed to the set operating speed based at least in part upon detection of the lid member being moved back to its closed position.

7. The mixer of claim 6, wherein the control system is configured such that a predefined time condition must also be met before the control system increases the speed of the agitator drive from the ingredient add speed to the set operating speed.

8. The mixer of claim 1, further comprising a pivot shaft, wherein the lid member is pivotably connected for pivot about the pivot shaft and the screen member is pivotably connected for pivot about the pivot shaft.

9. The mixer of claim 8, wherein the pivot shaft is external of the internal mixing volume, and the lid member includes at least one opening through which the screen member is pivotably connected to the pivot shaft.

10. The mixer of claim 9, further comprising at least one latch system for holding the lid member and the screen member in their respective closed conditions.

11. The mixer of claim 1, wherein a pair of pneumatic cylinders are connected to control movement of the lid member and, when the cover assembly is in the second configuration, the screen member with the lid member.

12. A food ingredient mixer, comprising:
a tank defining an internal mixing volume, the tank including an upper opening;
an agitator disposed in the internal mixing volume and movable for mixing ingredients; and
a cover assembly associated with the upper opening, the cover assembly including a first part through which ingredients may be added to the internal mixing volume and a second part movable between a first position that overlies the first part and a second part that exposes the first part, wherein the first part comprises a pivotable screen member and the second part comprises a pivotable lid member.

13. A food ingredient mixer, comprising:
a tank defining an internal mixing volume, the tank including an upper opening;
an agitator disposed in the internal mixing volume and movable for mixing ingredients;
a cover assembly associated with the upper opening, the cover assembly including:
a screen member movable between a closed position covering the upper opening and an open position uncovering the upper opening, the screen member including a plurality of openings through which ingredients can be added to the tank when the screen member is in the closed position; and
a lid member movable between a closed position covering the upper opening and an open position uncovering the upper opening, wherein the lid member overlies the screen member when the lid member is in the closed position, wherein, in a first configuration of the cover assembly, the lid member is movable from its closed position to its open position while the screen member remains in its closed position;
an agitator drive for controlling movement of the agitator; and
a control system configured for controlling the agitator drive based at least in part upon the position of at least one of the lid member or the screen member, wherein the control system is configured to detect movement of the screen member out of its closed position and, in such case, to prevent operation of the agitator drive.

14. The mixer of claim 13, wherein the control system is configured to detect movement of the lid member out of its closed position, while the screen member remains in its closed position, and, in such case to reduce a speed of the agitator drive from a set operating speed to an ingredient add speed.

15. The mixer of claim 14, wherein the control system is configured to increase the speed of the agitator drive from the ingredient add speed to the set operating speed based at least in part upon detection of the lid member being moved back to its closed position.

16. The mixer of claim 15, wherein the control system is configured such that a predefined time condition must also be met before the control system increases the speed of the agitator drive from the ingredient add speed to the set operating speed.

* * * * *